H. A. MYERS.
AUTOMATIC VALVE ADJUSTER FOR INTERNAL COMBUSTION ENGINES.
APPLICATION FILED NOV. 2, 1914.
1,134,695.
Patented Apr. 6, 1915.
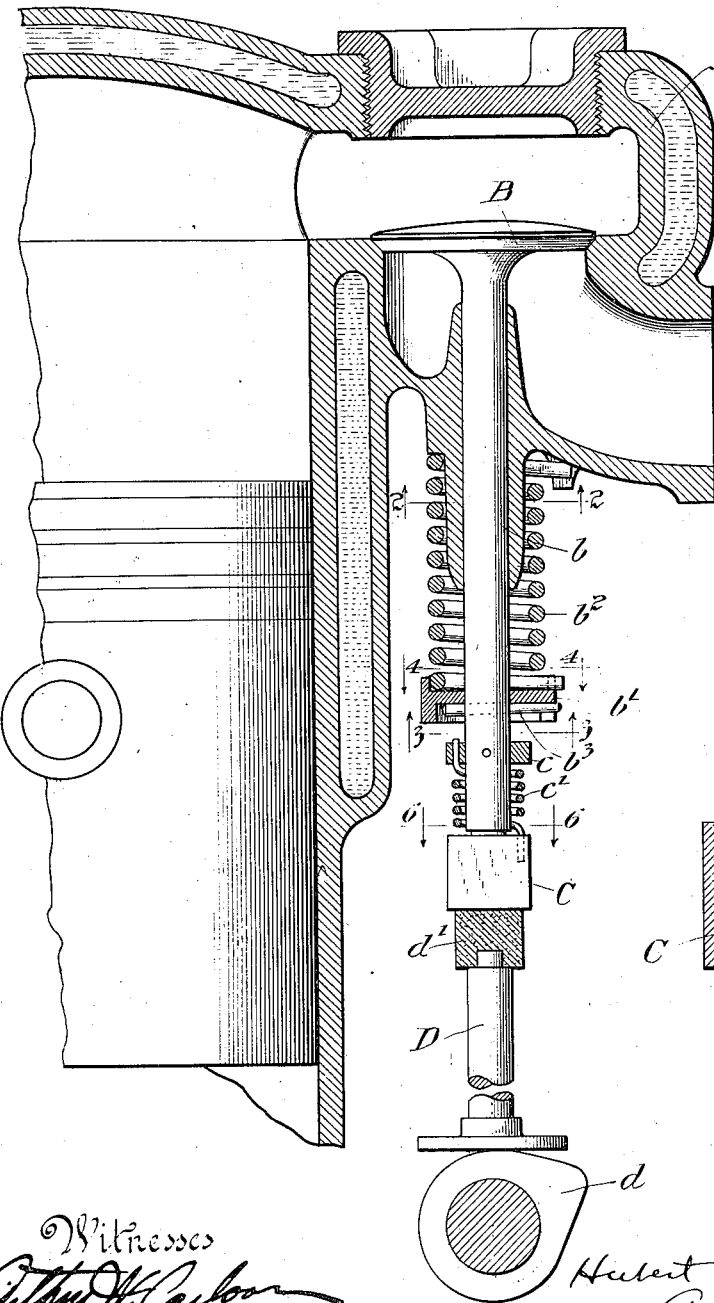
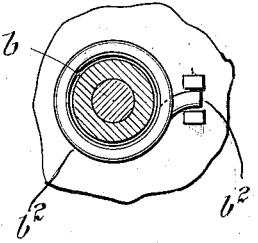
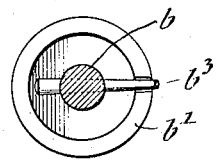
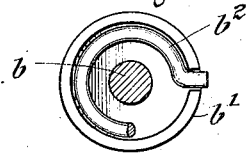
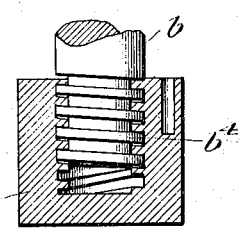
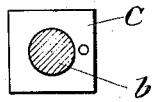

UNITED STATES PATENT OFFICE.

HUBERT A. MYERS, OF TOLEDO, OHIO, ASSIGNOR OF ONE-HALF TO ARTHUR S. HICKOK, OF TOLEDO, OHIO.

AUTOMATIC VALVE-ADJUSTER FOR INTERNAL-COMBUSTION ENGINES.

1,134,695.

Specification of Letters Patent.

Patented Apr. 6, 1915.

Application filed November 2, 1914. Serial No. 869,790.

*To all whom it may concern:*

Be it known that I, HUBERT A. MYERS, a citizen of the United States of America, and resident of Toledo, Lucas county, Ohio, (business address, 1231 Ohio Building,) have invented a certain new and useful Improvement in Automatic Valve-Adjusters for Internal-Combustion Engines, of which the following is a specification.

My invention relates to the valve mechanism of an internal combustion engine, and more particularly to that portion of the said mechanism by which the lost motion resulting from wear is taken up between the valve and the actuating means therefor. This has been done in various ways, but so far as I am now aware the devices previously employed for this purpose have always required the stopping of the engine, inasmuch as the adjustment of the valve mechanism was done by manual adjustment or manipulation of certain parts thereof. In some cases, in fact, new elements were introduced in order to take up the wear and prevent an undesirable amount of lost motion.

The object of my invention is, therefore, to provide a valve mechanism of this kind having means for automatically taking up lost motion resulting from wear, whereby no manual adjustment or manipulation of the parts will be necessary.

It is also an object to provide certain details and features of construction tending to increase the general efficiency and certainty of operation of an automatic valve adjusting device of this particular character.

To the foregoing and other useful ends my invention consists in matters hereinafter set forth and claimed.

In the accompanying drawings—Figure 1 is a sectional view of a portion of an internal combustion engine, showing the usual inlet valve in elevation, and illustrating partly in section and partly in elevation an automatic adjusting means embodying the principles of my invention. Fig. 2 is a detail section on line 2—2 in Fig. 1. Fig. 3 is a similar section on line 3—3 in Fig. 1. Fig. 4 is a similar section on line 4—4 in Fig. 1. Fig. 5 is an enlarged vertical section of the nut or cap which is screwed on the lower end of the valve stem, showing the lower threaded portion of said stem in section. Fig. 6 is a section on line 6—6 in Fig. 1.

As thus illustrated, my invention comprises an engine valve casing A of any suitable known or approved construction, provided with the usual inlet valve B for controlling the admission of fuel to the cylinder. The said valve has a downwardly extending stem $b$ provided at a distance above its lower end with a collar $b^1$ providing a seat for the lower end of the spring $b^2$ by which the valve is yieldingly held in closed position. The lower end of said spring is preferably secured to said collar, and the upper end of the collar is preferably secured to the valve casing, any suitable provision being employed for this purpose. A removable pin $b^3$ is employed for holding the collar $b^1$ in place on the valve stem. At its lower end said stem $b$ is provided with square screw threads $b^4$, and the nut or cap C is provided internally with square threads for engaging the said threaded portion of the valve stem; and it will be observed that the screw threads thus provided are of such character that the nut or cap C is slightly loose on the lower end of the stem, whereby said cap can be moved up and down slightly without disturbing the valve stem. A collar $c$ is secured to the valve stem in any suitable manner, and a spring $c^1$ is interposed between this collar and the top of the nut or cap C, the opposite ends of said spring being secured respectively to said collar and nut or cap. The usual push rod D is connected at its lower end by the cam $d$ ordinarily employed for this purpose, and is provided at its upper end with a bumper $d^1$ of fiber or other suitable material. This bumper engages the bottom of the nut or cap C, whereby the rotation of the cam $d$ causes the valve stem $b$ to move up and down in the usual and well known manner.

In practice, the nut or cap C has a constant tendency to unscrew from the lower end of the valve stem, by reason of the looseness of the screw threads, whereby lost motion is automatically taken up between this nut or cap and the top of the bumper $d^1$; and this tendency is increased somewhat by the tension of the spring $c^1$, this spring being wound up or tensioned in such manner that it tends constantly to rotate the said nut or cap in a direction to unscrew the same from the lower end of the valve stem. Consequently, and as fast as the actuating parts become worn, the lost motion resulting therefrom is automatically taken up by a slight adjustment of the parts. At the same time, however, the looseness of the screw threads of the nut or cap C, on the lower end of the valve stem, is sufficient to take care of the expansion and contraction of the valve stem $b$, or any of the other parts, whereby there is always a sufficient amount of lost motion to prevent the expansion of the valve stem or other parts from unseating the valve, it being understood that this valve must always seat tightly in order to produce the desired result.

The device will operate without the spring $c^1$, when the screw threads $b^4$ and those of the nut or cap C are made sufficiently loose in the manner explained; but as a matter of further and special importance, and with a view to insuring greater certainty in the automatic adjustment of the mechanism to take up lost motion resulting from wear, the said spring $c^1$ is applied in such manner that it tends constantly to unscrew the said nut or cap. With this arrangement, therefore, the nut or cap C always bears tightly against the top of the bumper $d^1$, thus preventing any lost motion at this point in the operating connections for the valve. Notwithstanding this it is also true, as explained, that when the valve stem becomes slightly heated and expands the looseness of the square threads at the lower end of the stem serves to prevent the expansion from unseating the valve.

From the foregoing it will be seen that the element C is subject to adjustment by the operation of the valve to take up wear. In other words, the vibration and jarring of the parts tends constantly to adjust this element downward. Also, the spring $c^1$ serves constantly to automatically adjust this element C in a manner to automatically take up wear. This occurs, of course, while the valve is in operation and without stopping the engine. It is obvious, however, that changes and modifications can be made without departing from the spirit of my invention, and for this reason I do not limit myself to the exact form and construction shown and described.

What I claim as my invention is:—

1. A valve mechanism for internal combustion engines, comprising a valve stem, a self adjusting engaging portion screwed on the lower end of said stem, a spring for closing said valve, and means for engaging said portion to open said valve against the tension of said spring, said portion being arranged to unscrew automatically to maintain the engagement thereof with said means.

2. A valve mechanism for internal combustion engines, comprising a valve stem, a movable element for operating said valve, a spring for closing said valve, and means subject to constant adjustment by the operation of said valve for automatically taking up lost motion between said stem and element.

3. A valve mechanism for internal combustion engines, comprising two members for actuating the valve, one said member having a self adjusting portion screwed thereon and arranged to automatically unscrew therefrom to engage the other member, and a spring for closing said valve.

4. A valve mechanism comprising a valve stem, a push rod for operating said stem, a spring for closing said valve, and means subject to constant adjustment by the operation of said valve for automatically taking up lost motion between said stem and rod, including a self adjusting engaging portion loosely screwed on the lower end of said stem, said rod having a bumper for engaging said portion.

5. A valve mechanism comprising a valve stem, a push rod for operating said stem, a spring for closing said valve, and means for automatically taking up lost motion between said stem and rod, including a self adjusting engaging portion loosely screwed on the lower end of said stem, said rod having a bumper for engaging said portion, and a spring tending constantly to unscrew said portion to take up wear, the loose screw threads insuring sufficient lost motion to prevent expansion of said stem from opening the valve.

6. A valve mechanism for internal combustion engines, comprising a valve, an actuating element, and an operating connection between said valve and element, including means subject to constant adjustment by the operation of said valve for automatically taking up lost motion resulting from wear.

7. A valve mechanism for internal combustion engines, comprising a valve, an actuating element, and an operating connection between said valve and element, including means for automatically taking up lost motion resulting from wear, said means including a screw portion having a loose thread to prevent expansion from unseating the valve, said portion having a constant tendency to unscrew and thereby take up the wear.

8. A valve mechanism comprising an operating connection provided with a screw threaded element and a spring tending constantly to unscrew said element to automatically take up wear.

9. A valve mechanism comprising an operating connection provided with a screw threaded element and a spring tending constantly to unscrew said element to automatically take up wear, said element having loose screw threads to provide lost motion and thereby prevent expansion of the parts from opening said valve.

10. A valve mechanism comprising an operating connection provided with a screw threaded element subject to adjustment by the operation of the valve to take up wear.

11. A valve mechanism comprising an operating connection provided with a screw threaded element subject to adjustment by the operation of the valve to take up wear, said element having loose screw threads to provide lost motion and thereby prevent expansion of the parts from opening said valve.

Signed by me at Chicago, Illinois, this 29th day of October 1914.

HUBERT A. MYERS.

Witnesses:
RACHEL J. RICHARDSON,
ROSE E. SEHNEM.